United States Patent
Hermann et al.

(10) Patent No.: US 9,580,339 B2
(45) Date of Patent: Feb. 28, 2017

(54) DROP-IN CELL FOR ELECTROLYTIC DISINFECTION OF WATER

(75) Inventors: Robert Hermann, Oberaich (AT); Michael Schelch, Oberaich (AT); Wolfgang Staber, Bruck an der Mur (AT); Wolfgang Wesner, Vienna (AT)

(73) Assignee: pro aqua Diamentelektroden Produktion GmbH und Co KG (AT)

( * ) Notice: Subject to any disclaimer, the term of this patent is extended or adjusted under 35 U.S.C. 154(b) by 614 days.

(21) Appl. No.: 12/967,544

(22) Filed: Dec. 14, 2010

(65) Prior Publication Data
US 2011/0147203 A1 Jun. 23, 2011

(30) Foreign Application Priority Data
Dec. 16, 2009 (AT) ................. A 1997/2009

(51) Int. Cl.
| | | |
|---|---|---|
| *C02F 1/467* | (2006.01) | |
| *C02F 1/461* | (2006.01) | |
| *C02F 103/42* | (2006.01) | |

(52) U.S. Cl.
CPC ........ *C02F 1/4674* (2013.01); *C02F 1/46109* (2013.01); *C02F 2001/46128* (2013.01); *C02F 2001/46138* (2013.01); *C02F 2103/42* (2013.01); *C02F 2201/4612* (2013.01); *C02F 2209/05* (2013.01); *C02F 2209/29* (2013.01)

(58) Field of Classification Search
CPC ............................ C02F 1/4674; C02F 1/46109
USPC ........................................................ 204/271
See application file for complete search history.

(56) References Cited

U.S. PATENT DOCUMENTS

| | | | | |
|---|---|---|---|---|
| 4,714,534 A | * | 12/1987 | Fair et al. ................ | 204/269 |
| 6,488,835 B1 | * | 12/2002 | Powell ..................... | 205/744 |
| 2002/0046957 A1 | * | 4/2002 | Hough et al. ............ | 205/744 |
| 2003/0149220 A1 | * | 8/2003 | Hoefer et al. ............ | 528/92 |
| 2004/0251213 A1 | * | 12/2004 | Bradley ................... | 210/748 |
| 2006/0039070 A1 | * | 2/2006 | Sugimura ............ | G02B 5/305 |
| | | | | 359/487.02 |
| 2006/0151803 A1 | * | 7/2006 | Wesner et al. ........... | 257/103 |
| 2006/0249400 A1 | * | 11/2006 | Bremauer ................. | 205/743 |
| 2007/0111081 A1 | * | 5/2007 | Martin ...................... | 429/38 |

(Continued)

FOREIGN PATENT DOCUMENTS

WO WO 2007116004 A2 * 10/2007 ............ B32B 5/00
WO 2011008322 1/2011

*Primary Examiner* — Bryan D. Ripa
(74) *Attorney, Agent, or Firm* — Ostrolenk Faber LLP

(57) ABSTRACT

The invention relates to a drop-in cell for disinfection of water from bathing pools, particularly whirlpools, with an electrolytic cell (10) which can be flowed through by water and has two contact electrodes (1, 2), which are positioned in parallel and spaced apart from each other, and preferably at least one bipolar diamond particle electrode (3), which is arranged between the contact electrodes (1, 2) at a distance from them.

Figure 3A:
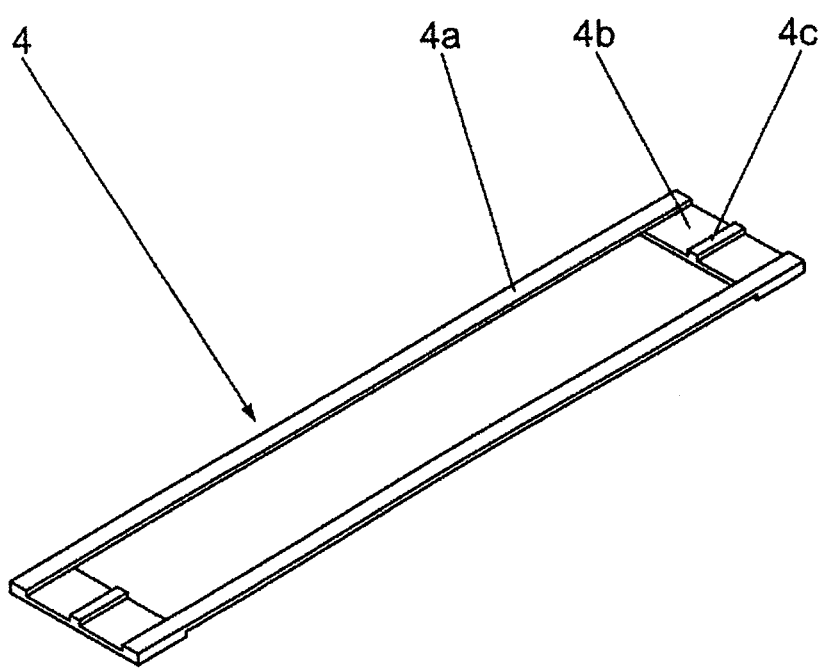

The electrodes (1, 2, 3) are joined together by spacers (4) located between them to form an elongate, approximately cuboidal electrode pack, which is embedded in a casing (6) of plastic or synthetic resin while leaving an inflow and an outflow free. The user/customer is therefore provided with a drop-in cell which can be positioned in the circuit of the pool water or in the whirlpool and can be "installed" or, as and when required, removed and/or replaced without any problem by the user/customer himself.

8 Claims, 2 Drawing Sheets

(56) References Cited

U.S. PATENT DOCUMENTS

| | | | |
|---|---|---|---|
| 2008/0264788 A1* | 10/2008 | Uthemann et al. | 204/412 |
| 2009/0261663 A1* | 10/2009 | Aso | H02K 41/03 310/12.02 |
| 2010/0170783 A1* | 7/2010 | Wesner | B32B 5/00 204/290.07 |
| 2011/0010835 A1* | 1/2011 | McCague | 4/494 |
| 2011/0253637 A1 | 10/2011 | McCague | |

* cited by examiner

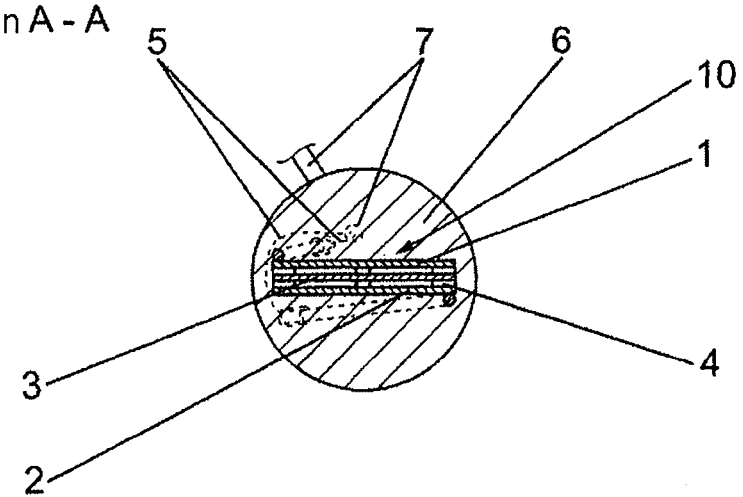
Fig. 2 Section A - A
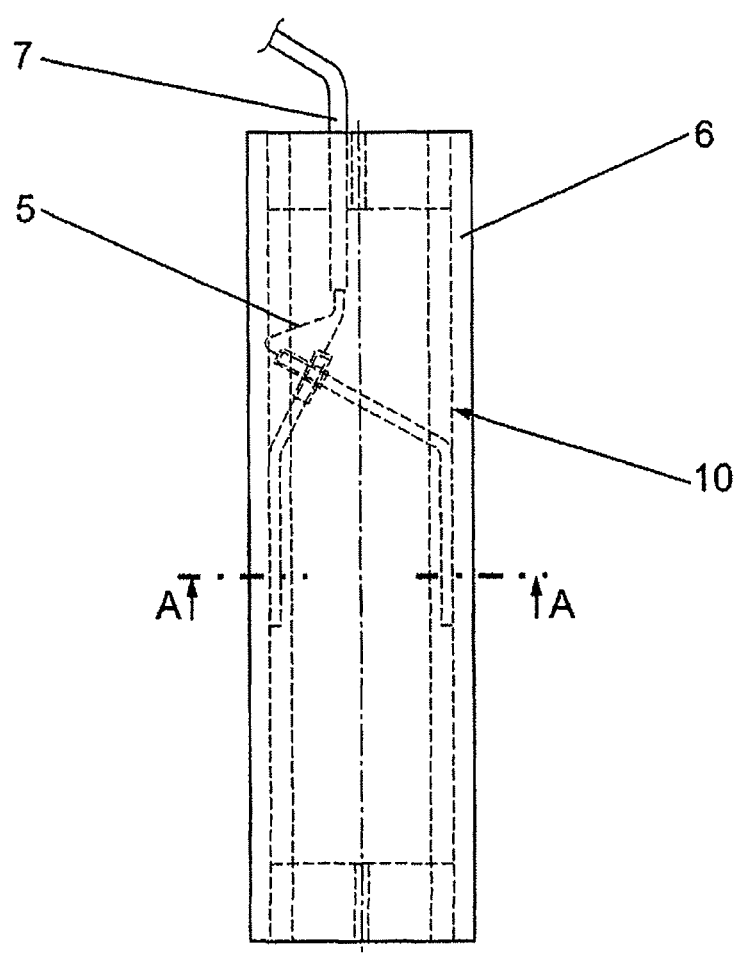
Fig. 1

DROP-IN CELL FOR ELECTROLYTIC DISINFECTION OF WATER

The invention relates to a drop-in cell for electrolytic disinfection of water from bathing pools, particularly whirlpools, with an electrolytic cell which can be flowed through by water and has two contact electrodes, which are positioned in parallel and spaced apart from each other, and preferably at least one bipolar diamond particle electrode, which is arranged between the contact electrodes at a distance from them.

It is known to use electrolytic cells for the disinfection of pool water. Disinfection with electrolytic cells is virtually maintenance-free and there is no need for measured amounts of chlorine to be added in the form of tablets or powder. The electrolytic cells are installed in the circuit of the pool water, in particular in the bypass, and controlled by means of corresponding measurement and control instrumentation, optionally by means of a timer. Depending on the size of the pool, continuous disinfection of the bathing water can be ensured in this way.

The invention is based on the object of providing a drop-in cell which is suitable for small pools, particularly for whirlpools, can be positioned in the circuit of the pool water or in the pool itself and can without any problem be positioned and replaced as and when required by the user/customer.

The set object is achieved according to the invention by the electrodes being joined together by a spacer or by spacers located between them to form an elongate, approximately cuboidal electrode pack, which is embedded in a casing of plastic or synthetic resin while leaving an inflow and an outflow free.

The invention provides the customer or user with a drop-in cell which he can safely position himself, for example in the filter nozzle of the pool or directly in the pool or in the whirlpool, and can remove as and when required for cleaning or replacement. No particular installation effort is required for the drop-in cell.

According to a preferred embodiment of the invention, the electrode pack is created in such a way that it is closed on its sides that are in contact with the casing. This prevents undesired flowing of the plastic or synthetic resin into the electrolytic cell during the production of the casing.

For convenient easy handling and positioning of the drop-in cell in the circuit of the pool water or in the whirlpool, for instance on a holder, it is of advantage if the casing is of a cylindrical design.

In the case of one embodiment of the invention, the casing consists of cured casting resin. This casing can be produced at low cost and in a simple manner.

In the case of another embodiment, the casing consists of a plastic bonded to the electrode pack by injection molding. When relatively large numbers are concerned, this type of production of the casing is more efficient and inexpensive.

Each spacer is designed essentially as a rectangular frame made of a plastic which is connected to an electrode respectively on the outside and inside, openings for the water to flow through being left free at the parts of the frame on the ends. With spacers of such a design, the electrodes can be joined together particularly easily to form a cuboidal electrode pack.

The electrodes can be connected, for example adhesively attached, to the surrounding frame of the spacer or spacers in a simple way.

In the case of an alternative embodiment, the plastic spacers may be formed by injection-molding the plastics material onto the electrodes and be firmly connected to them in this way.

The electrical conductors connected to the contact electrodes are led out of the casing to the outside, particularly in a shared cable. Therefore, only one cable needs to be led to the control unit and connected there. The control unit controls the operation of the electrolytic cell with regard to time periods and time intervals, particularly in dependence on measured values of the water that are determined, for example the free chlorine and/or the redox potential.

Figure 3B:
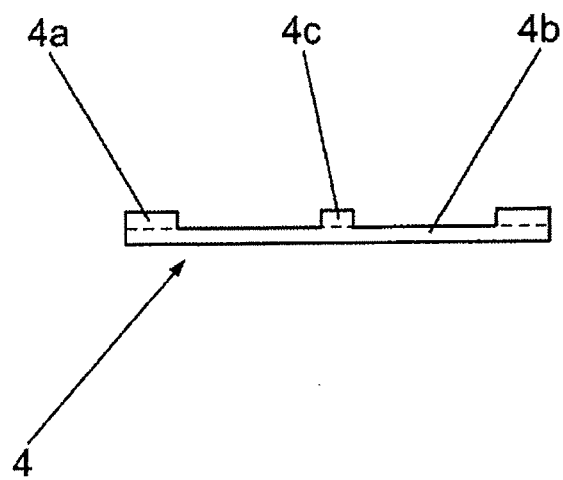

Further features, advantages and details of the invention are now described in more detail on the basis of the schematic drawing, which represents an exemplary embodiment and in which FIG. 1 shows a view of an embodiment of a drop-in cell designed according to the invention, FIG. 2 shows a section along the sectional plane of FIG. 1, represented by the line A-A, and FIGS. 3a and 3b show views of a spacer.

The invention is concerned with a drop-in cell for the electrolytic disinfection of pool water, particularly bathing water of a whirlpool. In the electrolytic disinfection of water, electric current is used to produce disinfectants directly in the water by electrochemical conversion of the substances contained in the water. When operated in situ, this involves the water to be treated being passed directly through an electrolytic cell into the drop-in cell and the disinfectants formed from the water passing over directly into the water to be treated. With the electrolytic cell described in more detail below, free chlorine, ozone and hydrogen peroxide are formed in particular as disinfectants.

The electrolytic cell 10 shown in FIG. 1 and FIG. 2, embedded in the drop-in cell, has as the anode and cathode two contact electrodes 1, 2, which are arranged parallel to each other and are of an elongate rectangular design and between which a bipolar diamond particle electrode 3 is arranged at a distance from the two contact electrodes 1, 2. Between each of the contact electrodes 1, 2 and the diamond particle electrode 3 there is in each case a spacer 4 consisting of plastic. FIG. 3a shows the inner side of the spacer 4, FIG. 3b shows an end side. The spacer 4 is designed as a rectangular plastic frame, on one side of which, which is later the outer side of the electrolytic cell 10, the respective contact electrode 1, 2 is adhesively attached, closing the frame opening and finishing flush with the long frame sides 4a. On the inner side, the transverse frame sides 4b are set back from the longitudinal frame sides 4a and provided in the middle with an additional web 4c, which, as FIG. 3b shows, is level with the longitudinal frame sides 4a. The diamond particle electrode 3 is adhesively attached by one side respectively to the inner sides of the two spacers 4. The contacting of the two contact electrodes 1, 2 takes place in particular by means of titanium rods (not shown), which are attached to the contact electrodes 1, 2 by appropriate joining methods, such as welding or screwing. Connected to the titanium rods are electrical conductors 5, which are jointly led out of the electrolytic cell 10 to the outside, in a single cable 7. The required insulation of the connection points—cable to titanium rods and titanium rods to contact electrodes 1, 2—can be performed, for example, by means of PTFE shrink-fit tubes. The electrode pack formed in this way is embedded on the outside in a synthetic resin casing 6, which cylindrically surrounds the electrolytic cell 10 and leaves the end sides thereof free. To produce the casing 6, the ready-made electrolytic cell 10 is introduced into a casting mold and a 2-component synthetic resin, for example polyester resin or epoxy resin, is stirred and poured in. After curing of the resin, the drop-in cell is removed from the casting mold and covers that are not represented are positioned on the end sides. The electrical conductors 5 and a piece of the cable 7 are likewise cast in the resin. Alternatively, the electrode pack may be encapsulated in the known way in an injection mold with a plastic, for example polypropylene or polyethylene, which forms the casing after curing. Furthermore, a plastic tube which is filled with synthetic resin in a casting mold may also be used.

The two contact electrodes 1, 2 may be commercially available electrodes, in particular of iridium-/ruthenium- or platinum-coated titanium sheet, graphite electrodes or diamond electrodes. The bipolar diamond particle electrode 3 may be an electrode as specified in WO-A-2007 116004. These known diamond particle electrodes consist of synthetically produced and electrically conductive (doped) diamond particles, which are embedded as a single layer in a support layer of plastic and are exposed on both sides of the support layer.

For operation, the drop-in cell is preferably positioned in the filter nozzle of the pool or else, when used in a whirlpool, directly in the whirlpool on a holder. No special fitting needs to be performed in the filter nozzle, the drop-in cell is simply hung in the filter nozzle. The drop-in cell can be easily taken out of the system by the customer himself and cleaned and replaced as and when required.

The drop-in cell is connected in the known way to a power supply (grid or storage battery) and a control unit, which controls/regulates the operation of the drop-in cell. The operation of the drop-in cell may be controlled in specific time intervals, in particular in dependence on measured values that are determined, particularly the free chlorine content or the redox potential of the water. The electrical conductivity present in the water is generally sufficient to ensure the operation of the electrolytic cell 10. If need be, however, the conductivity of the water may be increased by adding a small amount of salt, particularly in the range between 0.5 g and 1.5 g per liter. How long the time intervals for which the drop-in cell is operated are chosen depends on the intensity with which the pool is used and the number of persons using the pool. The intervals can be set directly by the user and be reduced or extended as and when required. It is of advantage to provide the control unit with an intensive cleaning operating mode for the drop-in cell, in order to reproduce the depleted oxidation agents as quickly as possible again after bathing.

For the removal of lime deposits on the electrodes, a pole reversal is carried out regularly and automatically, the time intervals of which can likewise be set and depend in particular on the hardness of the water, a pole reversal only being performed after quite a long period of time in the case of soft water, in particular between one and three hours, but in particular after fifteen to thirty minutes in the case of hard water.

The invention is not restricted to the exemplary embodiment represented. For example, the casing may be of a different shape, for instance in the form of a cube.

The electrode pack or the electrolytic cell may comprise a number of bipolar diamond particle electrodes. In the simplest case, the electrolytic cell may have just two contact electrodes, as mentioned, which are kept at a distance from each other by means of a spacer. The spacers may, furthermore, be produced by plastics material being injection-molded onto the electrodes in an injection mold in the known way.

LIST OF DESIGNATIONS

1 . . . contact electrode
2 . . . contact electrode
3 . . . diamond particle electrode
4 . . . spacer
4a . . . longitudinal side
4b . . . transverse side
4c . . . web
5 . . . electrical conductor
6 . . . casing
7 . . . cable
10 . . . electrolytic cell

The invention claimed is:

1. Drop-in cell for disinfection of water in bathing pools, comprising:
an electrolytic cell which has two contact electrodes and at least one bipolar diamond particle electrode arranged between the contact electrodes,
the contact electrodes and the diamond electrode being positioned in parallel and spaced apart from each other by a spacer made of plastic material,
the contact electrodes, the at least one diamond particle electrode and the spacers located between the electrodes being joined together to form an elongate, approximately rectangular electrode pack having two narrow ends,
the spacers having openings defined therebetween at the narrow ends of the electrode pack permitting water to flow through the cell between the electrodes,
the electrode pack being completely enclosed, except at the narrow ends, by a casing made of cured synthetic potting resin, the electrode pack being potted within the resin casing, the resin casing having water inflow and outflow openings corresponding to the openings at the narrow ends of the electrode pack.

2. Drop-in cell according to claim 1, characterized in that the electrode pack is closed on its sides that are in contact with the casing.

3. Drop-in cell according to claim 1, characterized in that the spacer is a rectangular frame having a pair of opposite ends, a pair of opposite sides, and a pair of opposite major faces, the spacer being connected to a corresponding one of the contact electrodes at one of the major faces of the frame, the openings for the water to flow through the electrode pack being defined by openings at the ends of the frame.

4. Drop-in cell according to claim 3, characterized in that the contact electrodes are adhesively attached to the spacers at edges of the electrodes and the spacers.

5. Drop-in cell according to claim 1, characterized in that electrical conductors are connected to the contact electrodes and are led to the outside in a shared cable.

6. Drop-in cell according to claim 1, characterized in that the contact electrodes are selected from the group consisting of iridium/ruthenium-coated and platinum-coated titanium sheet, graphite electrodes, and diamond electrodes.

7. Drop-in cell accordingly to claim 1, characterized in that each spacer is a rectangular frame having a pair of opposite ends, a pair of opposite sides, and a pair of opposite major faces, wherein said major faces are connected respectively to the corresponding contact electrode and bipolar electrode.

8. Drop-in cell accordingly to claim 1, wherein said electrolytic cell has exactly one bipolar diamond electrode arranged between said two contact electrodes.

* * * * *